United States Patent
Narayan et al.

(10) Patent No.: US 9,577,298 B2
(45) Date of Patent: Feb. 21, 2017

(54) HIGH EFFICIENCY IRON ELECTRODE AND ADDITIVES FOR USE IN RECHARGEABLE IRON-BASED BATTERIES

(75) Inventors: Sri R. Narayan, Arcadia, CA (US); G. K. Surya Prakash, Hacienda Heights, CA (US); Robert Aniszfeld, Los Angeles, CA (US); Aswin Manohar, Los Angeles, CA (US); Souradip Malkhandi, Los Angeles, CA (US); Bo Yang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/524,761

(22) Filed: Jun. 15, 2012

(65) Prior Publication Data

US 2013/0149615 A1 Jun. 13, 2013

Related U.S. Application Data

(60) Provisional application No. 61/497,454, filed on Jun. 15, 2011.

(51) Int. Cl.
*H01M 12/08* (2006.01)
*H01M 4/12* (2006.01)
(Continued)

(52) U.S. Cl.
CPC ............ *H01M 12/08* (2013.01); *H01M 4/12* (2013.01); *H01M 4/364* (2013.01); *H01M 4/62* (2013.01); *H01M 4/622* (2013.01); *H01M 12/065* (2013.01)

(58) Field of Classification Search
USPC ................................ 429/402–405
See application file for complete search history.

(56) References Cited

U.S. PATENT DOCUMENTS 3,023,259 A * 2/1962 Coler et al. ............... 429/127
3,023,260 A * 2/1962 Coler et al. ............... 429/94
(Continued)

FOREIGN PATENT DOCUMENTS

| CN | 101651208 A | 2/2010 |
|---|---|---|
| EP | 0677883 A1 | 3/1995 |

(Continued)

OTHER PUBLICATIONS

M. Volmer et al., "Electrochemical and Electron Spectroscopic Investigations of Iron Surfaces Modified with Thiols," Surface and Interface Analysis, vol. 16, 278-282 (1990).

(Continued)

*Primary Examiner* — Maria J Laios
(74) *Attorney, Agent, or Firm* — Brooks Kushman P.C.

(57) ABSTRACT

An iron electrode and a method of manufacturing an iron electrode for use in an iron-based rechargeable battery are disclosed. In one embodiment, the iron electrode includes carbonyl iron powder and one of a metal sulfide additive or metal oxide additive selected from the group of metals consisting of bismuth, lead, mercury, indium, gallium, and tin for suppressing hydrogen evolution at the iron electrode during charging of the iron-based rechargeable battery. An iron-air rechargeable battery including an iron electrode comprising carbonyl iron is also disclosed, as is an iron-air battery wherein at least one of the iron electrode and the electrolyte includes an organosulfur additive.

20 Claims, 11 Drawing Sheets

(51) Int. Cl.
*H01M 4/62* (2006.01)
*H01M 12/06* (2006.01)
*H01M 4/36* (2006.01)

(56) References Cited

U.S. PATENT DOCUMENTS

| | | | |
|---|---|---|---|
| 3,819,413 A * | 6/1974 | Nippe et al. | 429/217 |
| 3,935,027 A | 1/1976 | Warde et al. | |
| 4,032,693 A | 6/1977 | Lindstrom | |
| 4,047,894 A | 9/1977 | Kuehl | |
| 4,335,192 A * | 6/1982 | Oliapuram | 429/221 |
| 5,254,414 A | 10/1993 | Tsenter | |
| 6,899,971 B2 | 5/2005 | Hamada et al. | |
| 7,695,840 B2 | 4/2010 | Bartling | |
| 2003/0054208 A1 | 3/2003 | Oehr et al. | |
| 2004/0137310 A1 | 7/2004 | Kiros | |
| 2005/0112451 A1 | 5/2005 | Lee et al. | |
| 2005/0271932 A1 | 12/2005 | Wang Chen | |
| 2007/0077485 A1 | 4/2007 | Takamura et al. | |
| 2007/0077491 A1 * | 4/2007 | Burchardt | 429/218.2 |
| 2011/0027666 A1 | 2/2011 | Burchardt et al. | |
| 2012/0187918 A1 * | 7/2012 | Narayan et al. | 320/137 |

FOREIGN PATENT DOCUMENTS

| | | |
|---|---|---|
| GB | 1359746 A | 7/1974 |
| JP | 2001313093 A | 11/2001 |
| JP | 2008293678 | 12/2008 |
| JP | 2009129646 | 6/2009 |
| WO | 2005004260 A1 | 1/2005 |
| WO | 2012/012731 A2 | 1/2012 |

OTHER PUBLICATIONS

K. Vijayamohanan et al., "Kinetics of Electrode Reactions Occurring on Porous Iron Electrodes in Alkaline Media," J. Electroanal. Chem., 295 (1990) pp. 59-70.
K. Vijayamohanan et al., "Rechargeable Alkaline Iron Electrodes," Journal of Power Sources, 34 (1991) pp. 269-285.
M. K. Debe et al., "Structural Characteristics of a Uniquely Nanostructured Organic Thin Film," J. Vac. Sci. Technol. B 13(3), May/Jun. 1995, pp. 1236-1241.
T. S. Balasubramanian et al., "Effect of Metal-Sulfide Additives on Charge/Discharge Reactions of the Alkaline Iron Electrode," Journal of Power Sources, 41 (1993), pp. 99-105.
K. Vijayamohanan et al., "Role of Sulphide Additives on the Performance of Alkaline Iron Electrodes," J. Electroanal. Chem. 289 (1990), pp. 55-68.
International Search Report and Written Opinion for PCT/US2011/0450030 dated Feb. 27, 2012.
International Search Report and Written Opinion for PCT/US2012/042750 dated Jan. 30, 2013.
United States Patent and Trademark Office, Office Action for U.S. Appl. No. 13/189,038 mailed Aug. 22, 2013.
Extended European Search Report dated Feb. 25, 2015, in European Appn. No. 12800120.3 filed Nov. 28, 2013, 3 pgs.

* cited by examiner

HIGH EFFICIENCY IRON ELECTRODE AND ADDITIVES FOR USE IN RECHARGEABLE IRON-BASED BATTERIES

CROSS-REFERENCE TO RELATED APPLICATIONS

This application claims the benefit of U.S. provisional Application No. 61/497,454 filed Jun. 15, 2011, the disclosure of which is incorporated in its entirety by reference herein.

STATEMENT REGARDING FEDERALLY SPONSORED RESEARCH OR DEVELOPMENT

The invention was made with Government support under ARPA-E funded Project DE-AR0000136 from the U.S. Department of Energy. The Government has certain rights to the invention.

TECHNICAL FIELD

Embodiments herein relate to high efficiency iron electrodes and additives for rechargeable iron-air or other iron-based batteries, such as for large-scale battery-based energy storage.

BACKGROUND

Large-scale electrical energy storage systems are needed to accommodate the intrinsic variability of energy supply from solar and wind resources. Such energy storage systems will store the excess energy during periods of electricity production, and release the energy during periods of electricity demand. Viable energy storage systems will have to meet the following requirements: (i) low installed-cost of <$100/kWh, (ii) long operating life of over 5000 cycles, (iii) high round-trip energy efficiency of over 80%, and (iv) ease of scalability to megawatt-hour level systems. Rechargeable batteries are particularly suitable for such large-scale storage of electrical energy because of their high round-trip efficiency and scalability. Among the types of rechargeable batteries under consideration are vanadium-redox, sodium-sulfur, zinc-bromine, zinc-air and lithium-ion batteries. In addressing the challenges of durability, cost, and large-scale implementation of the foregoing types of batteries, the beneficial features of iron-based alkaline batteries for large-scale energy storage have been largely overlooked.

Nickel-iron batteries have been used in various stationary and mobile applications for over 70 years in the USA and Europe until the 1980s when the iron-based batteries were largely supplanted by sealed lead-acid batteries. Because of their high specific energy, iron-air batteries underwent active development for electric vehicles and military applications in the 1970s after the "oil shock" but major research in this area was abruptly discontinued after 1984 and with few exceptions iron electrodes have not received significant attention since that time. However, despite being less conspicuous in common applications, iron-based alkaline batteries such as iron-air and nickel-iron batteries have unique characteristics that make them very attractive and highly suitable for meeting the emerging need of grid-scale electrical energy storage systems.

The electrochemistry of the iron electrode in alkaline batteries involves the redox process involving iron (II) hydroxide and elemental iron:

$$Fe(OH)_2 + 2e^- \leftrightarrows Fe + 2OH^- \quad E°=-0.877 \text{ V} \quad (1)$$

The forward reaction occurs during charging of the electrode and the reverse reaction occurs during discharge.

Iron, the primary raw material for iron-based battery systems, is globally abundant, relatively inexpensive, easily-recycled, and eco-friendly. Also, the iron electrode is well-known for being robust over repeated cycles of charge and discharge. Stable performance over 3000 charge and discharge cycles has been demonstrated in nickel-iron batteries. Such robustness is extraordinary as most rechargeable battery electrodes degrade within 1000 cycles. The robustness of the iron electrode is attributed to the low solubility of the hydroxides of iron in alkaline media. The principal limitation of the iron electrode is its low charging-efficiency that is in the range of 55-70%. This limitation arises from the wasteful hydrogen evolution that occurs during charging according to the following reaction:

$$2H_2O + 2e^- \leftrightarrows H_2 + 2OH^- \quad E°=-0.828 \text{ V} \quad (2)$$

The hydrogen evolution reaction occurs because the electrode potential for this reaction is positive to that of the iron electrode reaction (Eq. 1). Consequently, batteries will have to be overcharged by 60-100% to achieve full capacity. The hydrogen evolution that occurs during charging is undesirable because it lowers the round-trip energy efficiency and results in loss of water from the electrolyte. Thus, suppressing hydrogen evolution at the iron electrode has far-reaching benefits of raising the overall energy efficiency, lowering the cost, and increasing the ease of implementation of iron-based batteries in large-scale energy storage systems. However, suppressing hydrogen evolution and achieving an iron electrode with a charging-efficiency close to 100%, without interfering with the other performance features of the electrode, has been a formidable challenge for many years.

Another limitation of commercially available iron batteries is their inability to be discharged at high rates; when discharged in less than five hours (also termed the five-hour rate), the capacity realized is very small. Grid-scale electrical energy storage requires that the battery be capable of being charged and discharged in one to two hours. The discharge rate capability of the iron electrode can be improved if the passivation by the electrically non-conductive iron (II) hydroxide, (the discharge product) can be mitigated (Eq. 1). Shukla et at have demonstrated the beneficial role of various additives on mitigating passivation (K Vijayamohanan et al., *J. Electroanal. Chem.*, 289, 55 (1990); T S Balasubramanian, *J. Appl. Electrochem.*, 23, 947 (1993)). However, achieving high rate capability and high efficiency simultaneously continues to be a challenge.

SUMMARY

In one embodiment, an iron electrode is disclosed for use in an iron-based rechargeable battery, the electrode comprising carbonyl iron powder and one of a metal sulfide additive or metal oxide additive selected from the group of metals consisting of bismuth, lead, mercury, indium, gallium, and tin for suppressing hydrogen evolution at the iron electrode during charging of the iron-based rechargeable battery.

In another embodiment, an iron-air rechargeable battery is disclosed, the battery comprising an iron electrode comprising carbonyl iron, an air electrode spaced from the iron electrode, and an electrolyte in contact with the iron electrode and the air electrode.

In another embodiment, an iron-air rechargeable battery is disclosed, the battery comprising an iron electrode, an air electrode spaced from the iron electrode, and an electrolyte in contact with the iron electrode and the air electrode, wherein at least one of the iron electrode and the electrolyte includes a organosulfur additive.

In another embodiment, a method is disclosed for manufacturing an iron electrode for use in an iron-based rechargeable battery, the method comprising combining carbonyl iron powder with a polymeric binder to create a mixture, coating a metallic grid with the mixture, and heating and applying pressure to the grid to form a pressed-plate iron electrode.

DETAILED DESCRIPTION

Figure 1:
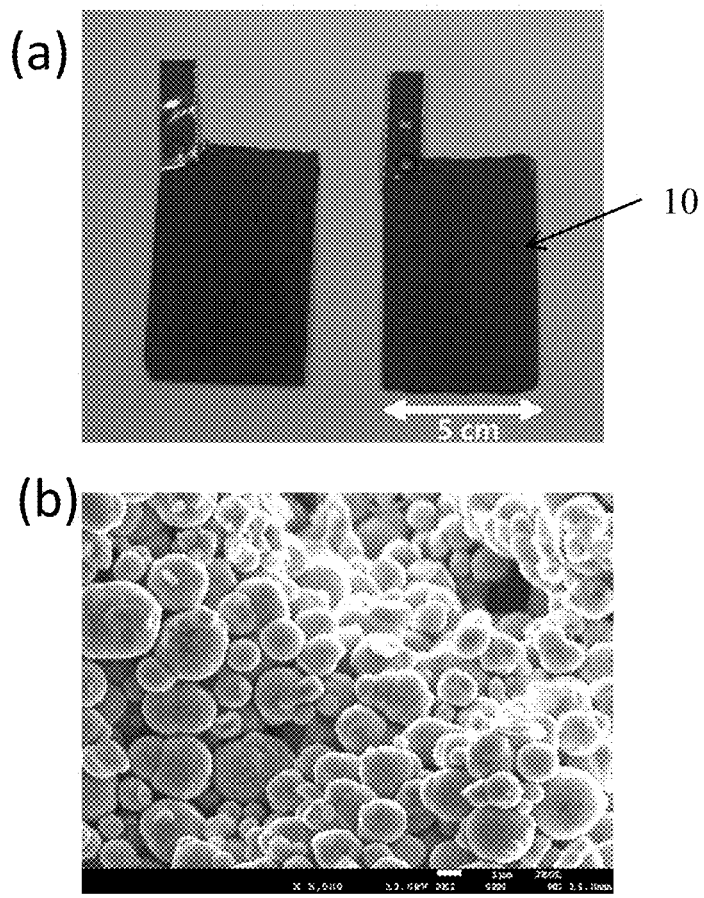
FIGS. 1a and 1b are photographs of the electrode design according to disclosed embodiments, including pressed-plate electrodes constructed from carbonyl iron powder (1a) and the morphology of carbonyl iron powder in the electrode (1b)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inexpensive, robust and efficient large-scale electrical storage systems are vital to the utilization of electricity generated from solar and wind resources. In this regard, the low cost, robustness, and eco-friendliness of aqueous iron-based rechargeable batteries are particularly attractive and compelling. However, wasteful evolution of hydrogen during charging and the inability to discharge at high rates have limited the deployment of iron-based aqueous batteries.

Embodiments disclosed herein include a stable high-performance iron electrode in which a ten-fold decrease in hydrogen evolution rate is achieved without interfering with the kinetics of the iron electrode reaction. With this level of suppression of hydrogen evolution, the charging efficiency has reached an unprecedented value of 96%. The iron electrode disclosed herein includes a specific charge storage capacity of 0.3 Ampere-hour/g, among the highest values reported for iron electrodes without any overcharge. Furthermore, this iron electrode can also be charged and discharged rapidly, exhibiting a twenty-fold increase in discharge rate capacity, meeting yet another important requirement for large-scale energy storage. The high-performance iron electrode disclosed herein overcomes the long-standing drawbacks and finally enables iron-air and nickel-iron technologies to become the basis of inexpensive, efficient and robust energy storage systems for grid-scale applications.

Embodiments include an iron-based battery with an electrode having a combination of iron materials and additives selected based on their ability to inhibit the hydrogen evolution reaction and enhance discharge rate capability. The rechargeable iron electrodes in prior art, commercial nickel-iron batteries are prepared from purified magnetite ore ($Fe_3O_4$) or by the chemical reduction of ferric oxide or other precursors. According to embodiments disclosed herein, the electrodes are prepared from high-purity carbonyl iron powder. Carbonyl iron powder includes spherical iron particles (e.g., 3-5 micron diameter) produced by the decomposition of iron pentacarbonyl. This material is post-treated in hydrogen at 300° C. to remove any residual oxygen and carbon. Upon such heat treatment, the unique "onion" structure of carbonyl iron is erased and the microstructure becomes homogeneous. Carbonyl iron powder, consisting of α-iron, is one of the purest forms of iron available commercially. According to disclosed embodiments, using such high-purity iron material is an important aspect of electrode formulation for inhibiting the hydrogen evolution reaction and achieving high charging efficiency.

To further improve the charging efficiency and achieve near complete suppression of hydrogen evolution, minute amounts of other materials are incorporated that can remain on the surface of carbonyl iron and inhibit the kinetics of hydrogen evolution. For example, elemental bismuth, lead, mercury, indium, gallium, and tin can be incorporated by in situ electro-reduction of these metal sulfides or metal oxides that effectively suppresses hydrogen evolution and also improves the discharge rate and utilization of the active materials. Bismuth is ideally suited for this application because it is non-toxic and does not compromise the eco-friendliness of the iron materials. Although the use of bismuth sulfide is described herein, it is understood that any of the above metals in sulfide or oxide form can be reduced to their elemental form and used in connection with the iron electrode and iron-based batteries disclosed herein.

In an embodiment, pressed-plate type electrodes 10 are prepared by combining the iron active material with a polymeric binder that is insoluble in the electrolyte, such as a polyethylene binder material, followed by the application of heat (FIG. 1). Such electrodes are inexpensive to fabricate. Alternate methods of electrode fabrication such as sintering, which use high temperature treatment in an inert gas atmosphere, entail much higher costs and are therefore less attractive compared to the pressed-plate type electrodes disclosed herein. The manufacturing cost consideration is important for meeting the challenging cost goals for large-scale energy storage as envisioned by the U. S. Department of Energy—ARPA-E.

In one formulation, the electrodes may include 50-99 w/w % carbonyl iron (SM grade BASF), approximately 5-50 w/w % potassium carbonate or similar soluble additive that creates pores when dissolved, and approximately 5-30 w/w % polymeric binder such as a polyethylene binder (MIPELON, Mitsui Chem USA). In another formulation, the electrodes may include approximately 81 w/w % carbonyl iron, approximately 10 w/w % soluble additive, and approximately 9 w/w % polymeric binder. In another formulation, a portion of the carbonyl iron, such as approximately 5%, may be substituted with bismuth sulfide (Aldrich). In such a formulation, the electrodes may include 50-99 w/w % carbonyl iron, approximately 5-50 w/w % soluble additive, approximately 5-30 w/w % polymeric binder, and approximately 1-10 w/w % bismuth sulfide. In another formulation, the electrodes may include approximately 76 w/w % carbonyl iron, approximately 10 w/w % soluble additive, approximately 9 w/w % polymeric binder, and approximately 5 w/w % bismuth sulfide. The powder mixture may be spread on a metallic grid, such as a degreased nickel grid or a nickel coated steel grid, and pressed at a temperature of about 140° C. and a pressure of about 5 kg cm$^{-2}$. It is understood that the temperature can range from about 60-250° C. depending on the specific binder material and the pressure can range from about 1-100 kg cm$^{-2}$ depending on technique used for pressing. The amount of iron in these electrodes corresponded to a calculated (theoretical) capacity of about 2 Ampere-hours. For testing, prior art, commercial iron electrodes were obtained from nickel-iron batteries manufactured by Sichuan Changong Battery Co., and these electrodes consisted of magnetite and graphite, largely.

Figure 2:
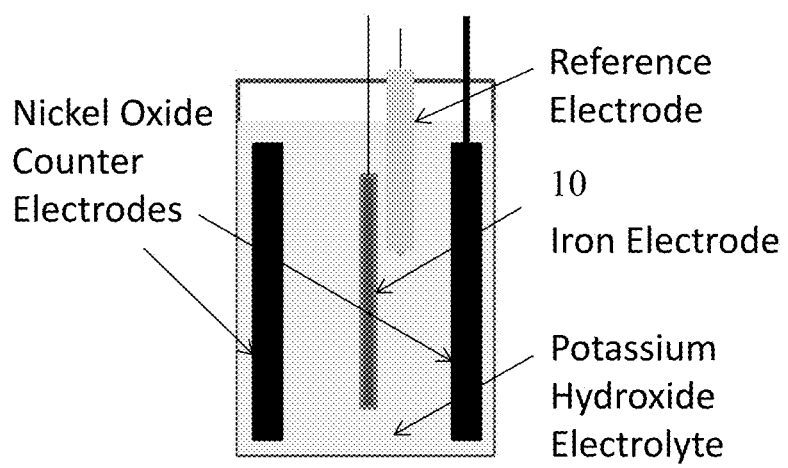
FIG. 2 is an illustration of an exemplary test cell configuration with an iron working electrode according to disclosed embodiments, a reference electrode, and nickel oxide counter electrodes-2 Ah, with an electrolyte of 30% potassium hydroxide.

The iron electrodes 10 disclosed herein were tested in a three-electrode cell. A nickel oxide battery electrode of the sintered type was used as the counter electrode (FIG. 2). A solution of potassium hydroxide (30 w/v %), similar that used in iron-based rechargeable batteries, was used as the electrolyte. All potentials were measured against a mercury/mercuric oxide (MMO) reference electrode ($E_{MMO}°$=+0.098 V vs. the normal hydrogen electrode).

The charging efficiency, discharge rate capability, and the response to repeated charge/discharge cycling were measured with a 16-channel battery cycling system (MACCOR-4200). The steady-state polarization studies were conducted with a potentiostat/galvanostat (VMC-4, PAR Ametek).

The charging efficiency was calculated as per the following:

$$\text{Charging Efficiency (\%)} = \{(Q_{charging} - Q_{H2})/Q_{charging}\} \times 100 \quad (3)$$

where $Q_{charging}$ is the total charge and $Q_{H2}$ is the charge used up in hydrogen evolution. The hydrogen evolution current, $I_{H2}$, at the charging potential E was calculated using the Tafel relationship, $$\text{Log}_{10}(I_{H2}/I_o) = (E - E_H°)/b \quad (4)$$

where $I_o$, and b are the exchange current and Tafel slope, respectively, determined from steady-state galvanostatic polarization measurements. $E_H°$ is the standard potential for the hydrogen evolution reaction.

Charging Efficiency.

The primary electrochemical process occurring during the charging of an iron electrode is the reduction of iron (II) hydroxide to iron (Eq. 1). However, hydrogen evolution (Eq. 2) also occurs simultaneously with the charging process. The diversion of part of the charging current towards the production of hydrogen results in low charging efficiencies.

Figure 3:
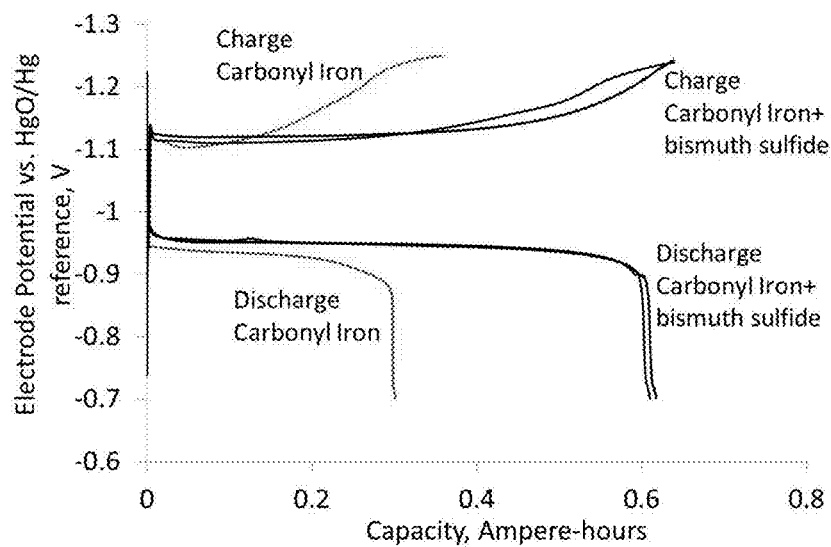
FIG. 3 is a graph illustrating exemplary charge and discharge profiles for carbonyl iron electrodes with and without a bismuth sulfide additive, wherein the charge rate is C/2 amperes (0.18 A for carbonyl iron, 0.32 A for carbonyl iron+bismuth) and the discharge rate is C/20 (0.018 A for carbonyl iron and 0.032 amperes for carbonyl iron+bismuth sulfide) with a temperature of 20-25° C.

Prior to measuring the charging efficiency, the pressed iron electrodes were charged and discharged about 30-40 times during which the discharge capacity increased to a stable value. The process of attaining a stable discharge capacity, termed "formation", has been recognized previously for iron electrodes. In accordance with disclosed embodiments, it was found that at the end of formation, the electrodes show a lower hydrogen evolution rate compared to the beginning of formation, a result that has not been reported for commercial electrodes. The formation process involves the repeated conversion of iron to iron (II) hydroxide followed by re-deposition as iron. This process could be expected to purify the carbonyl iron electrode further by the removal of any soluble impurities. All charging efficiency measurements were thus performed on such "formed" electrodes. The iron electrodes were charged to their rated capacity at C/2 rate and discharged to a cut off voltage of −0.7V vs. MMO at C/20 rate (C is the rated capacity of the electrode in Ampere-hours after formation, and C/n is the discharge current in Amperes). The voltage profiles during charge and discharge (FIG. 3) show that the charge input is almost completely recovered during discharge.

Figure 4:
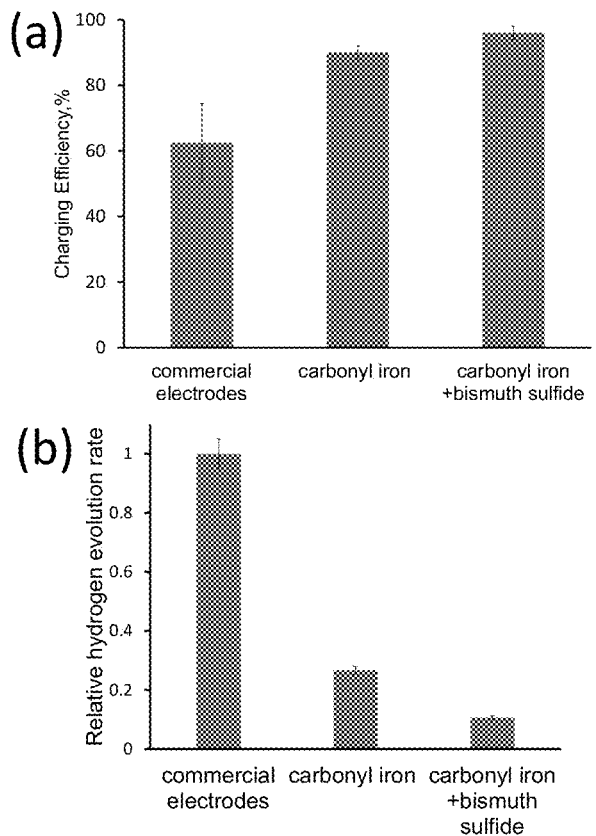
FIGS. 4a and 4b are graphs depicting the electrochemical performance characteristics of iron electrodes, including the charging efficiency at C/2 rate for three types of electrode compositions (4a) and the relative rates of hydrogen evolution of various electrodes when charged at C/2 rate (4b)
Figure 5:
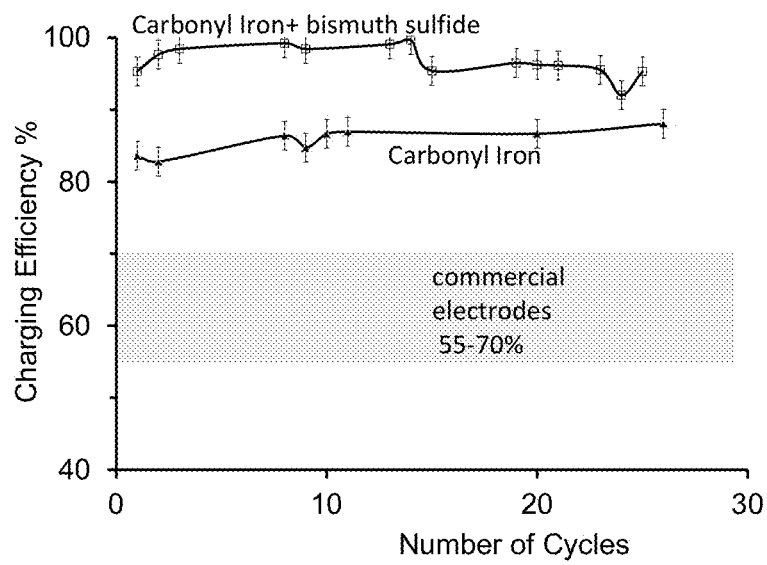
FIG. 5 is a graph of the charging efficiency as a function of cycling at C/2 rate of charge and C/20 rate of discharge, wherein the band refers to the charging efficiency of commercial electrodes from nickel-iron batteries supplied by BeUtilityFree (manufactured by Sichuan Changhong Battery Co., Ltd., Sichuan, China)

Specifically, the charging efficiency (Eq. 3) of the carbonyl iron electrode was found to be 90±1%. The electrodes formulated with carbonyl iron and bismuth sulfide showed an even higher charge efficiency of 96±1% (FIG. 4a). This high value of charge efficiency for the carbonyl iron electrode with bismuth sulfide represents a ten-fold decrease in the amount of hydrogen evolved during charging (FIG. 4b). Repeated cycling of these electrodes did not show any decline of this high value of charging efficiency (FIG. 5).

Figure 6:
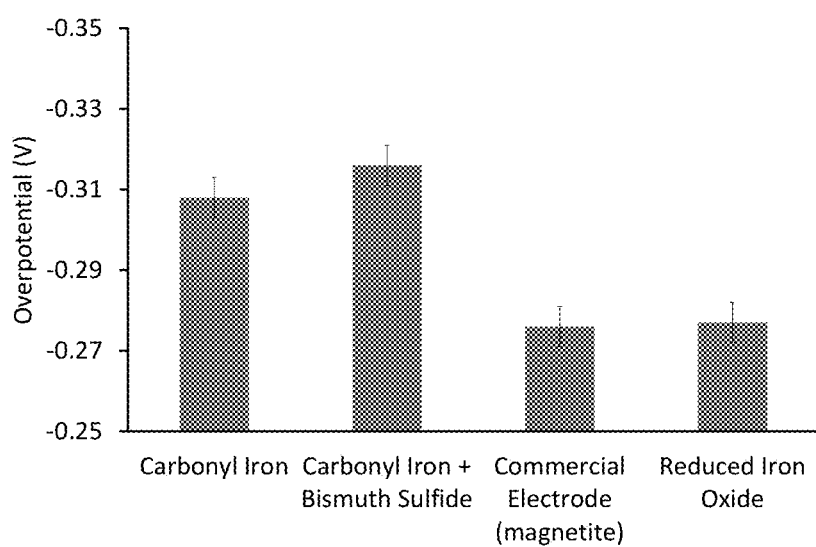
FIG. 6 is a graph of the hydrogen overpotential of various iron electrode materials during charging at C*/10 rate, where C* is the theoretical capacity based on the mass of the electrode material.

The increase in charging efficiency found with the high-purity carbonyl iron electrode is attributed to the high overpotential for hydrogen evolution on carbonyl iron. Of the various iron electrode materials that were tested, the ones made from carbonyl iron have the highest overpotential for hydrogen evolution reaction (FIG. 6).

Carbonyl iron does not contain the common impurities such as manganese, sulfur and phosphorus that are present in the reduced oxides. These impurities decrease the hydrogen overpotential and facilitate hydrogen evolution by increasing the ease of formation of adsorbed hydrogen species on the surface of iron.

A further decrease in the rate of hydrogen evolution has been achieved by the addition of bismuth sulfide to the carbonyl iron material. Bismuth sulfide is an electrically conducting solid, insoluble in the potassium hydroxide electrolyte. During charging, the bismuth sulfide is transformed into elemental bismuth (Eq. 5).

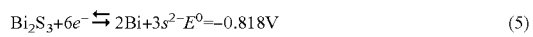

$$Bi_2S_3 + 6e^- \rightleftarrows 2Bi + 3s^{2-} E^0 = -0.818V \quad (5)$$

Figure 7:
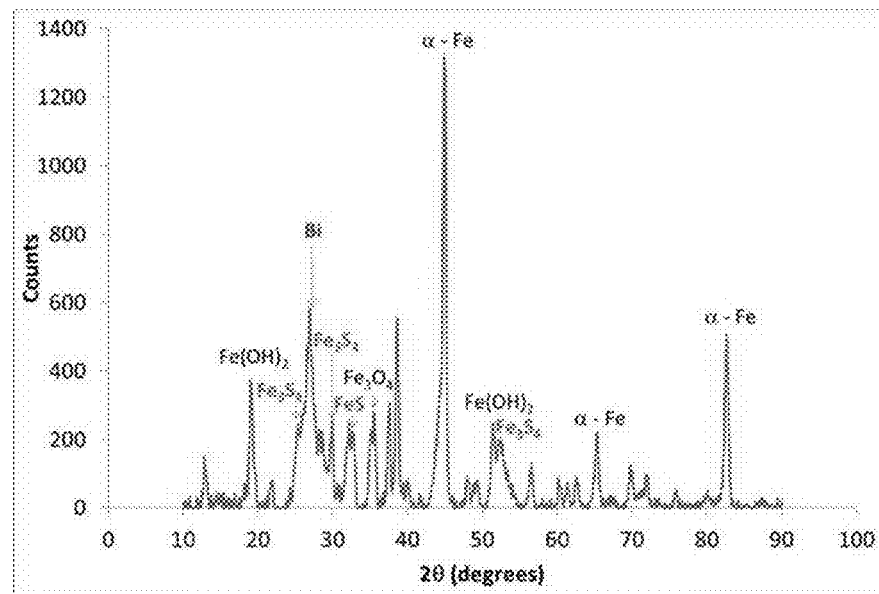
FIG. 7 is an x-ray diffractogram for a charged iron electrode prepared from carbonyl iron electrode and bismuth sulfide, with powder diffraction files Fe (00-006-0696), Fe(OH)$_2$ (00-013-0089), Fe$_3$O$_4$ (00-071-6766), Bi (00-044-1246), Fe$_3$S$_4$ (01-089-1998), and FeS (01-076-0964)

The electrode potential for the reduction of bismuth sulfide to bismuth is more positive than that of the iron electrode reaction (Eq. 1) and thus the charging process conducted at −1 V (vs. NHE) facilitates the formation of elemental bismuth. The presence of elemental bismuth in the charged electrodes was confirmed by X-ray powder diffraction (XRD) studies (FIG. 7).

It is the presence of elemental bismuth that increases the overpotential for hydrogen evolution on carbonyl iron (FIG. 6). The high hydrogen overpotential on bismuth is due to the unfavorable energetics for the electro-sorption of surface-bonded hydrogen intermediates.

Figure 8:
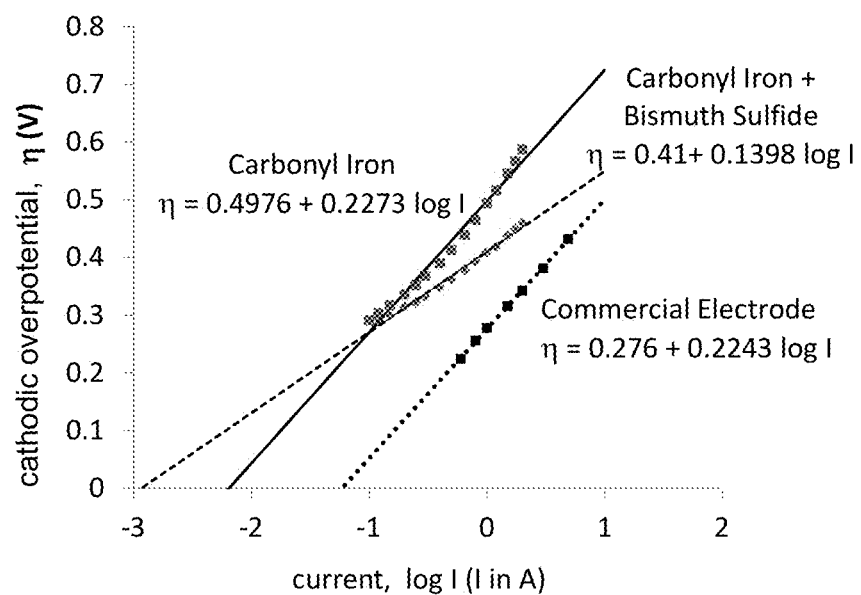
FIG. 8 shows cathodic Tafel polarization plots for fully-charged iron electrodes of various compositions, where parameters of the Tafel equation are also shown.

The kinetic parameters (exchange current and Tafel Slope) for the hydrogen evolution reaction on various iron electrodes were measured in the fully charged state where the only reaction resulting from the charging current is the hydrogen evolution reaction (FIG. 8).

As shown in the table below, the exchange current, a measure of the kinetics of the hydrogen evolution process, is ten times lower for the bismuth-containing electrodes. Using the exchange current and Tafel slopes, the current and electric charge diverted to hydrogen evolution at any stage in the charging process were calculated using Eq. 4. These calculations confirm that the observed increased charging efficiency (FIGS. 4 and 6) is due to the inhibition of the kinetics of hydrogen evolution by the in situ electrodeposition of elemental bismuth. The high overpotential for hydrogen evolution on bismuth is a property also exhibited, for example, by elemental forms of cadmium, lead, indium and mercury.

| Electrode | Exchange current, Amperes | Discharge Capacity, (A hr) | Exchange current (A/A hr) | Tafel Slope, (Volt/decade of current) | Calculated Efficiency (%) | Measured Efficiency (%) |
|---|---|---|---|---|---|---|
| Carbonyl Iron | $6.46 \times 10^{-3}$ | 0.36 | $1.80 \times 10^{-2}$ | 0.227 | 71 | 89 |
| Carbonyl Iron + bismuth sulfide | $1.17 \times 10^{-3}$ | 0.64 | $1.82 \times 10^{-3}$ | 0.140 | 84 | 96 |
| Commercial Electrode | $5.86 \times 10^{-2}$ | 9.59 | $6.11 \times 10^{-3}$ | 0.224 | 60 | 55-70 |

The observation of bismuth as a separate phase even at a low fraction of 5% is consistent with the insolubility of bismuth in iron predicted by the Hume-Rothery rules. This insolubility combined with the low surface energies of bismuth makes the re-distribution of bismuth into the iron matrix highly unfavorable. Consequently, the bismuth can be expected to remain on the surface of iron as nano-crystals or "ad-atoms" suppressing hydrogen evolution during charging. The bismuth present on the iron electrode does not undergo oxidation during the discharge process because the necessary electrode potential for electro-oxidation is not reached. In the event of over-discharge of the iron electrode, the bismuth will be oxidized to insoluble bismuth oxide. This bismuth oxide will be readily reduced to the elemental bismuth during the subsequent charge cycle. These characteristics of the bismuth deposits are consistent with the stable charging efficiency values observed in repeated cycles of charge and discharge (FIG. 5).

Discharge Rate Capability.

Figure 9:
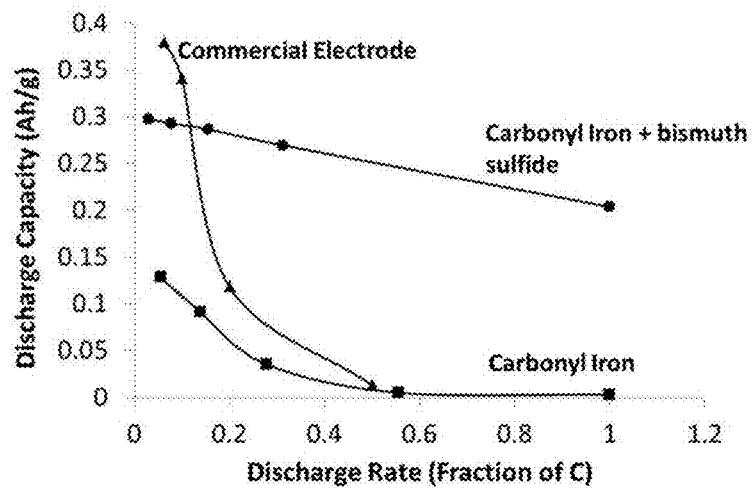
FIG. 9 is a graph illustrating the discharge capacity of iron electrodes as function of the normalized discharge rate, wherein the normalized discharge rate is expressed as 1/n times the nominal capacity in Ampere-hours, and n is the number of hours of discharge (for example, 1/n=0.5 corresponds to discharge in two hours of the entire capacity)

To meet the demands of large-scale energy storage, the batteries must be capable of being completely charged and discharged in one to two hours. The performance at different discharge rates is described by the term "rate-capability". The higher the rate-capability the smaller the battery required for a particular amount of stored energy. For many of the redox-flow type batteries, charging and discharging at high rates results in significant loss of efficiency. With the carbonyl iron electrode containing bismuth sulfide according to the disclosed embodiments, high discharge rate capability is achieved along with the improved charge efficiency. At a two-hour rate of discharge, the addition of bismuth sulfide provided a twenty-fold increase in capacity compared to the commercial electrode and a fifty-fold increase compared to the plain carbonyl iron electrode (FIG. 9).

The specific discharge capacity of the electrode with bismuth sulfide even at a one-hour discharge rate corresponds to about 60% of the maximum discharge capacity of the electrode. The commercial electrode yields almost no capacity at these high discharge rates. According to the disclosed embodiments, the excellent discharge rate capability of the electrodes formulated with bismuth sulfide can be attributed to the in situ formation of iron sulfides. In the XRD measurements on cycled electrodes that incorporated bismuth sulfide, iron sulfide phases corresponding to FeS and $Fe_3S_4$ were detected (FIG. 7). Therefore, it may be inferred that sulfide ions (from reduction of bismuth sulfide (Eq. 5)) reacted with the iron (II) hydroxide to form iron (II) sulfide (Eq. 6):

$$6\ S^{2-}+Fe(OH)_2=FeS+2\ OH^- \tag{6}$$

The iron (II) sulfide can react with sulfide ions to form various mixed-valence iron sulfides that are electronically conductive like iron (II) sulfide. The in situ incorporation of such electronically conductive iron sulfides will counter the passivation caused by the discharge product, iron (II) hydroxide, an electronic insulator.

Thus, the iron sulfide compounds maintain the electronic conductivity at the interface allowing the discharge reaction to be sustained at high rates. The high charging-efficiency of 96% combined with a high level of utilization of 0.3 Ah/g and fast discharge capability for the iron electrode achieved disclosed herein allow for the development of a very inexpensive and efficient iron electrode.

An iron battery that stores 1 kWh of energy will require approximately 3 kg of iron powder at the specific capacity of 0.3 Ah/g. At the cost of $1/kg (for high-purity iron in commercial quantities), the estimated cost of materials for the iron electrode is $3/kWh. Thus, the cost of the iron electrode in the disclosed embodiments can be as low as 3% of the cost target for large-scale energy storage. Such a low contribution to the cost from iron allows for generous cost allocations for other components such as the positive electrode, stacks and systems to meet the target of $100/kWh for grid-scale electrical energy storage.

The embodiments disclosed herein demonstrate a high-performance rechargeable iron electrode formulated with carbonyl iron and bismuth sulfide that is far superior in characteristics compared to a commercially available iron electrode. A ten-fold reduction in hydrogen evolution rate, a high charging-efficiency of 96%, a high discharge capacity of 0.3 Ah $g^{-1}$, and also a twenty-fold increase in capacity for the two-hour discharge rate are achieved. The high level of purity of carbonyl iron combined with the in situ produced bismuth electro-deposits suppress the wasteful evolution of hydrogen, while the in situ formation of mixed-valent conductive iron sulfides mitigates the passivation by iron hydroxide thereby allowing high discharge rates and high specific capacity to be simultaneously achieved. The efficiency and discharge performance are stable with repeated cycling. The disclosed embodiments also demonstrate that a viable "pressed-plate" type battery electrode can be inexpensively fabricated using this formulation of active materials. These high-performance electrodes have broken the once-formidable barrier of low charging efficiencies and unneeded hydrogen evolution in iron-based aqueous alkaline batteries. Thus, both iron-air and nickel iron batteries can now become the basis for low-cost, durable, and efficient large-scale electrical energy storage systems.

Figure 10:
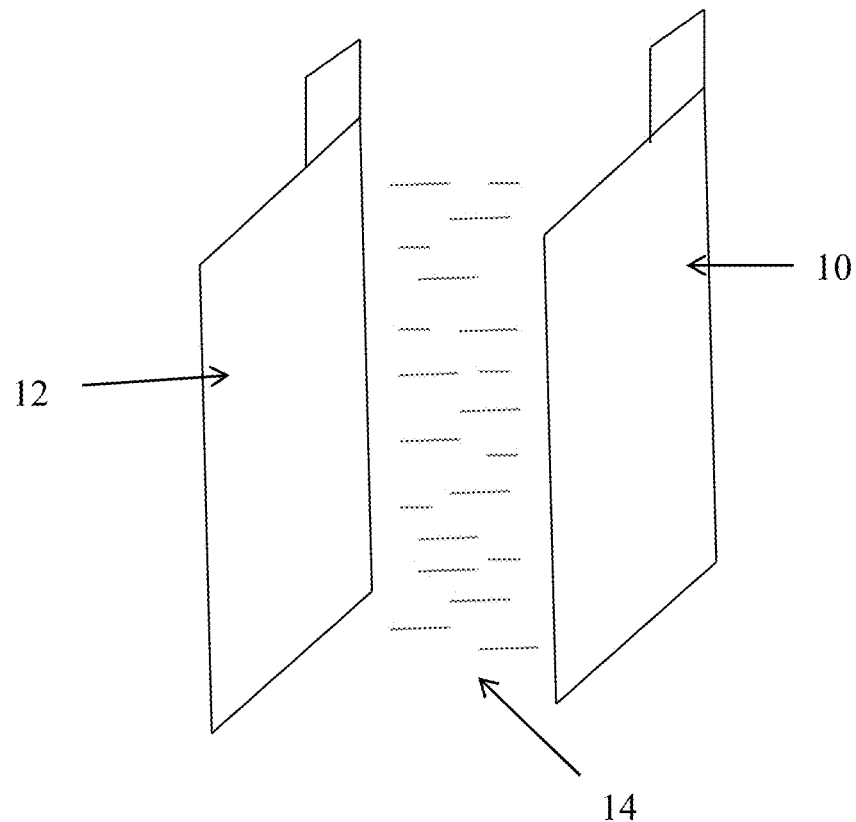
FIG. 10 is a schematic illustration of an iron-air battery.

As described above, a principal challenge in the large-scale deployment of the iron electrode in aqueous alkaline media has been the relatively low electrical efficiency due to hydrogen evolution that occurs on the iron electrode during charge and idle stand. The suppression of hydrogen evolution will have a transformational impact on the commercial deployment of iron-based batteries, such as the iron-air battery depicted in FIG. 10 having an iron electrode 10, air electrode 12, and electrolyte 14. Specifically, suppressing hydrogen evolution will: (1) enhance the round-trip efficiency of energy storage, (2) reduce the size of the battery, and (3) reduce the loss of water from the electrolyte during charging.

The self-discharge during "idle stand" of the battery is as follows:

$$Fe+2H_2O \rightarrow Fe(OH)_2+H_2 \tag{7}$$

From equations (2) and (7) it can be concluded that suppression of the hydrogen evolution reaction can be achieved by excluding water from the surface of the iron electrode.

Alkanethiols and other organosulfur compounds are known to form a self-assembled monolayer on various metal surfaces through the interaction of the sulfur atom of the thiol with various metals. Such self-assembled layers can be very compact and water repellent and can substantially reduce the access of reactants to the electrode solution interface. Therefore, such self-assembled monolayers of alkanethiol formed on an iron surface may inhibit the hydrogen evolution reaction. Since the properties of self-assembled monolayers depend on chain length of the alkanethiol, the degree of suppression of the hydrogen evolution reaction will depend on the molecular structure of the alkanethiol. If the self-assembled layer is too compact, then the total exclusion of water from the surface will also inhibit all the electrochemical processes including the desirable process of charging the battery electrode (Eq. 1). It is therefore important to identify the optimal chain length of alkanethiol that can achieve inhibition but not a complete blockage of the surface reactions.

Another important aspect of exploiting this type of self-assembly is the selectivity of formation of self-assembled monolayers only on the bare surface of iron and not on surfaces covered with oxides or hydroxides. Consequently, as iron hydroxide is converted to iron in the charging process, the adsorption of the alkanethiols can possibly cover the newly-generated iron surface to ensure the same level of suppression of hydrogen evolution during the entire charge process. As described herein, organosulfur additives can be added to the iron electrode itself or added to the electrolyte.

Three types of experiments were conducted to determine the effect of alkanethiols: (1) steady state potentiostatic polarization studies on polished iron disk electrodes, (2) electrochemical impedance spectroscopy of polished iron disk electrodes and (3) measuring the faradaic efficiency of charging and discharging porous iron electrodes prepared with high-purity carbonyl iron. The potentiostatic polarization and impedance measurements were conducted on a high-purity iron disk (99.999%, 5 mm diameter, Alfa-Aesar) mounted in a "rotating disk electrode" holder (Pine Instrument). The disk was polished with 0.05 micron alumina and cleaned with isopropanol and acetone before each experiment. Experiments were conducted in a fluoroethylene polymer cell that contained 1 M potassium hydroxide solution (purged with argon), a platinum wire counter electrode and a mercury-mercuric oxide (MMO) reference electrode (20% potassium hydroxide, $E°=+0.092V$). Unless otherwise mentioned, all values of electrode potential are reported versus the MMO reference electrode. The electrochemical cell was thoroughly cleaned prior to each experiment to avoid cross-contamination by the alkanethiols.

Steady-state polarization measurements, in the electrode potential range of −0.85 to −1.3 V vs. MMO reference electrode, were made by stepping the electrode potential 50 mV at a time and holding the potential for 300 seconds before recording the steady-state current. Electrochemical impedance was measured as a function of electrode potential with an excitation signal of amplitude of 2 mV (peak-to-peak) over the frequency range of 50 mHz to 100 kHz. The polarization and impedance experiments were repeated with the 1 M potassium hydroxide solution containing 10 mM of the alkanethiol. The electrodes were equilibrated in the alkanethiol-containing electrolyte for 60 minutes under argon flow prior to the measurements. Experiments were conducted with linear alkanethiols of the general formula $C_nH_{(2n-1)}SH$ and n values of 3, 4, 5, 6, 7, 8, 10, 11, and 12 (Sigma-Aldrich).

Figure 11:
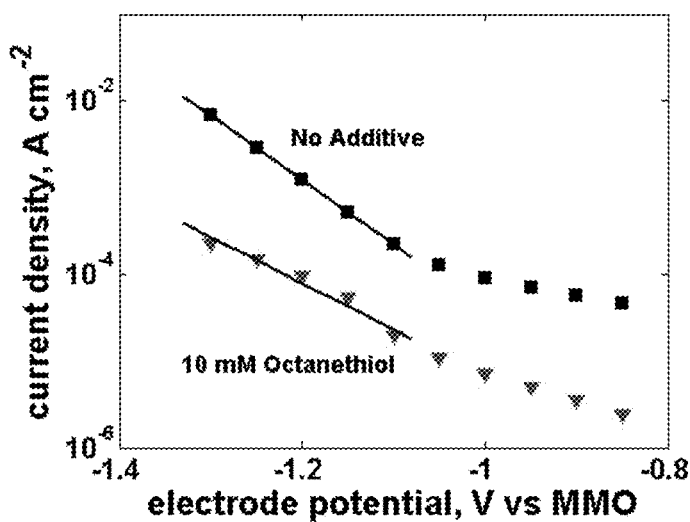
FIG. 11 is a graph depicting the steady-state potentiostatic polarization of rotating iron disk in 1M potassium hydroxide with and without octanethiol in the electrolyte.

Results of polarization measurements on the iron disk electrode with and without octanethiol in the electrolyte are shown in FIG. 11. With the addition of 10 mM of octanethiol, the current for hydrogen evolution decreases by about 25 times over the entire range of potential studied. This decrease in current confirms the adsorption of octanethiol on the surface of iron and its effectiveness in suppressing the hydrogen evolution reaction.

Figure 12A:
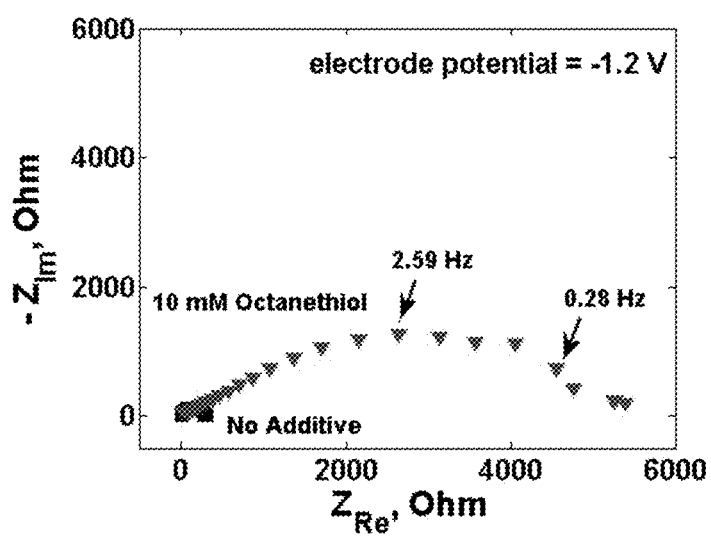
FIGS. 12a-b illustrate (a) a graph of exemplary impedance spectroscopy of iron disk electrode results at an electrode potential of −1.05V in the absence and presence of 10 mM octanethiol, and (b) an equivalent circuit used for analysis, wherein Rct is the charge-transfer resistance, Cdl is the double layer capacitance, and Rs is the series ohmic resistance of the electrolyte and electrodes.
Figure 12B:
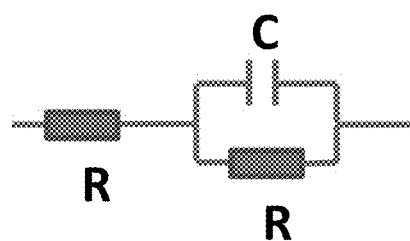

The results of impedance spectroscopy (FIG. 12a) were fitted to a simple equivalent circuit (FIG. 12b) consisting of double layer capacitance, charge transfer resistance and electrolyte resistance. The charge transfer resistance derived from the analysis of impedance decreases with electrode potential and increases with the addition of octanethiol (FIG. 12a) and this is consistent with the results from steady-state polarization measurements (FIG. 11). As before, it can be concluded that the adsorption of octanethiol decreases the available surface area for the hydrogen evolution reaction and thus causes an increase in the observed charge transfer resistance.

Figure 13:
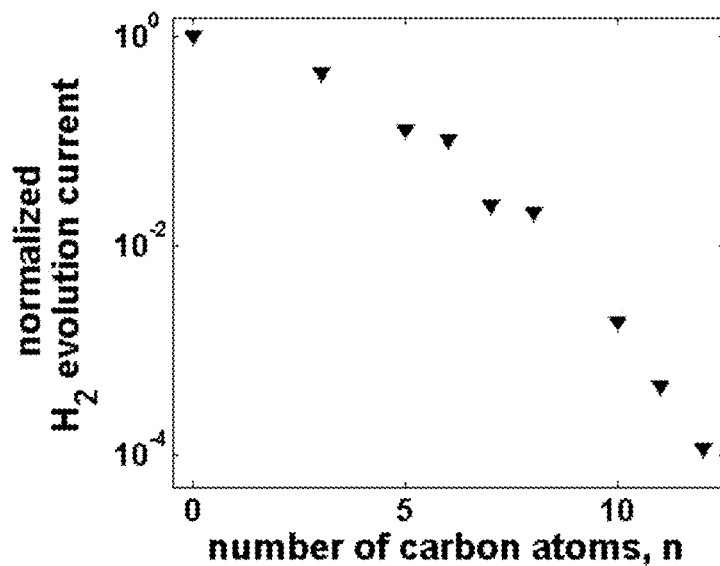
FIG. 13 is a graph of the dependence of the normalized hydrogen evolution current from potentiostatic polarization measurements at −1.20 V vs. MMO on the chain length of alkanethiol.

The current for hydrogen evolution measured by steady-state polarization measurements was found to strongly depend on the chain length of the alkanethiol. The relative hydrogen evolution rate was calculated by normalizing the hydrogen evolution current observed with the alkanethiol to that observed in the absence of the alkanethiol. At the chain length of n=12, the hydrogen evolution rate is reduced by as much as four orders of magnitude. Of course, lower chain lengths and higher chain lengths up to n=14 can also be utilized. These results suggest that the surface coverage and compactness of the self-assembled layer formed by the alkanethiols depend on the chain length. Thus, the desired degree of suppression of hydrogen evolution may be achieved by the appropriate choice of chain length (FIG. 13). To realize a 95% reduction in hydrogen evolution rate on iron, the "n" value for the alkanethiol should be chosen in the range of n=6 to 8.

Therefore, as described herein, self-assembled monolayers of alkanethiols can substantially reduce the rate of hydrogen evolution on the iron electrode in alkaline media and thereby overcome to a significant extent the problem of low charging efficiency of the rechargeable iron electrode. Steady-state potentiostatic polarization measurements and impedance analysis confirm that the suppression of hydrogen evolution occurs by coverage of the surface by the alkanethiol molecules that leaves a reduced area for electrochemical reaction. The chain length of the alkanethiol had a strong effect on the rate of hydrogen evolution. For a chain length of n=6, greater than a 90% reduction in hydrogen evolution rate could be achieved.

Finding a particular electrolyte additive that has good oxidation resistance in addition to selectively suppressing the hydrogen evolution reaction without affecting the kinetics of the battery electrode reaction is an important determination. The additive has to be stable at the negative electrode potentials of the iron electrode. Also, the additives to the electrolyte must be stable towards oxidation at the air electrode and must not impair the kinetics of the air electrode reactions.

Several different organo-sulfur additives were investigated for suppressing the hydrogen evolution during charging of the iron electrode. Initial screening of additives was carried out using cyclic voltammetry on rotating disk Pt electrode to determine the oxidative stability of different additives in 1M KOH solution. The counter electrode is a Pt wire and the reference electrode is mercury/mercuric oxide (MMO) reference electrode ($E_{MMO}°=0.098$ V vs. the normal hydrogen electrode). The cyclic voltammetry experiment was swept from −0.9V to 0.7V vs. MMO at a scan rate of 20 mV/s.

Steady state measurements and electrochemical impedance spectroscopy methods were employed to evaluate the influence of an organo-sulfur electrolyte additive on the hydrogen evolution reaction on iron. All experiments were carried out with polished high purity polycrystalline iron disk (99.997%, 5 mm diameter). The performance of the iron electrode in the absence and presence of the additive was evaluated in a half-cell containing Ar purged 1 M KOH. Steady state polarization was performed by holding the potential for 300 seconds for each 50 mV step from −1.3 V to −0.85 V vs. mercury mercuric oxide (20% KOH) reference electrode to determine hydrogen evolution current on iron at various potentials. Impedance measurements were performed just after the completion of each steady state potential step experiment to decide the effect of organic additive on the iron electrode from the change in double layer capacitance and polarization resistance.

Thiols are one of the most important compounds to protect the metal surface from the corrosion environment. The role of this adsorption-type inhibitor can be explained by the Lewis acid-base interaction on metal surfaces. The head group of the organic sulfur compounds contains atom S, which is strongly adsorbed to metal surface. Consequently the tail group contains hydrophobic alkane chain, which will form a very compact monolayer to protect the metal surface. The nature of the alkane chain will determine the compactness of the monolayer, thus affecting the accessibility of the metal surface in electrochemistry. Based on the compactness of the monolayer formed on the metal surface, organic sulfur compounds will have different effect on suppressing the hydrogen evolution in the iron-air battery.

For the application in the battery, the organic compounds have to have some extent of long term oxidative stability. Thiols can be oxidized to different products. Oxidation of thiols and other sulfur compounds changes the oxidation state of sulfur. Mild oxidation converts thiols to disulfides. Mild oxidation of disulfides gives alkylsulfenyl compounds, and more vigorous oxidation forms sulfonic acids. Oxidation of sulfides can lead first to sulfoxides and then to sulfones. So the sulfur compounds not only have to suppress hydrogen evolution effectively, but also have to be relatively stable during the electrochemical process.

Figure 14:
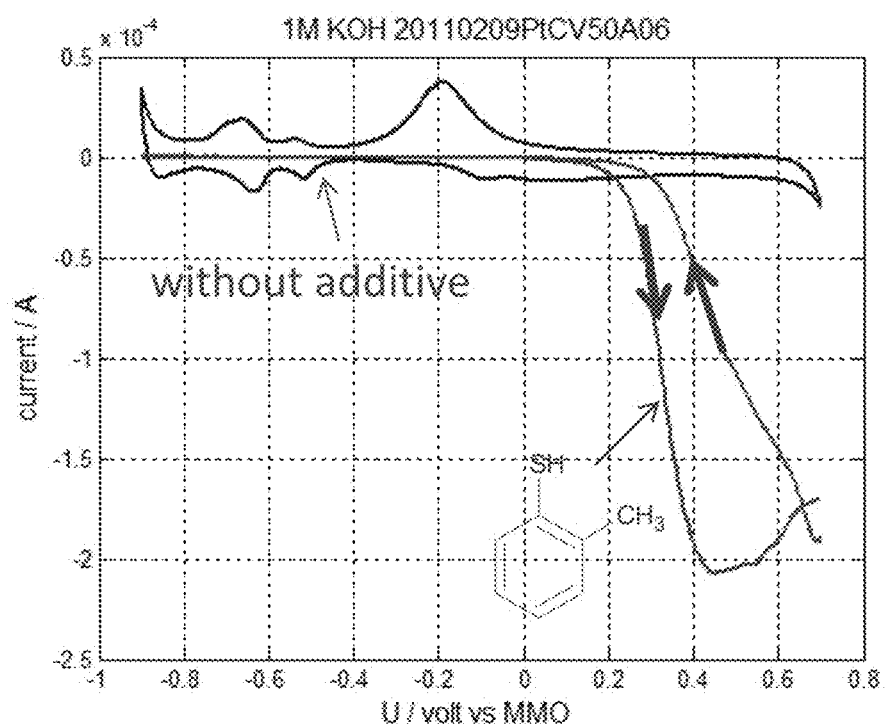
FIG. 14 is a graph depicting cyclic voltammetry on a Pt electrode without and with 2-methyl-bezene thiol in 1M KOH solution at a scan rate of 20 mV/s.

Starting from aromatic thiol compounds, compared to the cycle voltammetry (CV) curve without additive, it was observed that 2-methyl benzene thiol suppresses hydrogen adsorption on platinum and iron. A ten-fold increase in polarization resistance and the three-fold decrease in the double layer capacitance are observed. The adsorption of this molecule is favored by the pi-interaction from the aromatic chain. However, the oxidation of the molecule begins at 0.1 V vs. NHE (FIG. 14).

Figure 15:
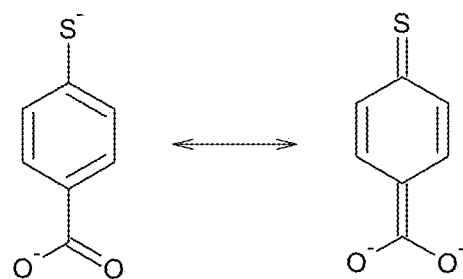
FIG. 15 illustrates the structure of resonance stabilized thiolate.

The thiolate is formed in sodium hydroxide solution and this will be oxidized to the disulfide at 0.1 V vs. NHE. If the oxidation of thiolate can be inhibited, then the benzenethiol based additives can be used for the suppression of hydrogen evolution. One possible approach is to use a resonance stabilized thiolate. For example, benzene thiol with a carboxylic acid substituent will allow for the stabilization of the thiolate, as shown in FIG. 15.

Figure 16A:
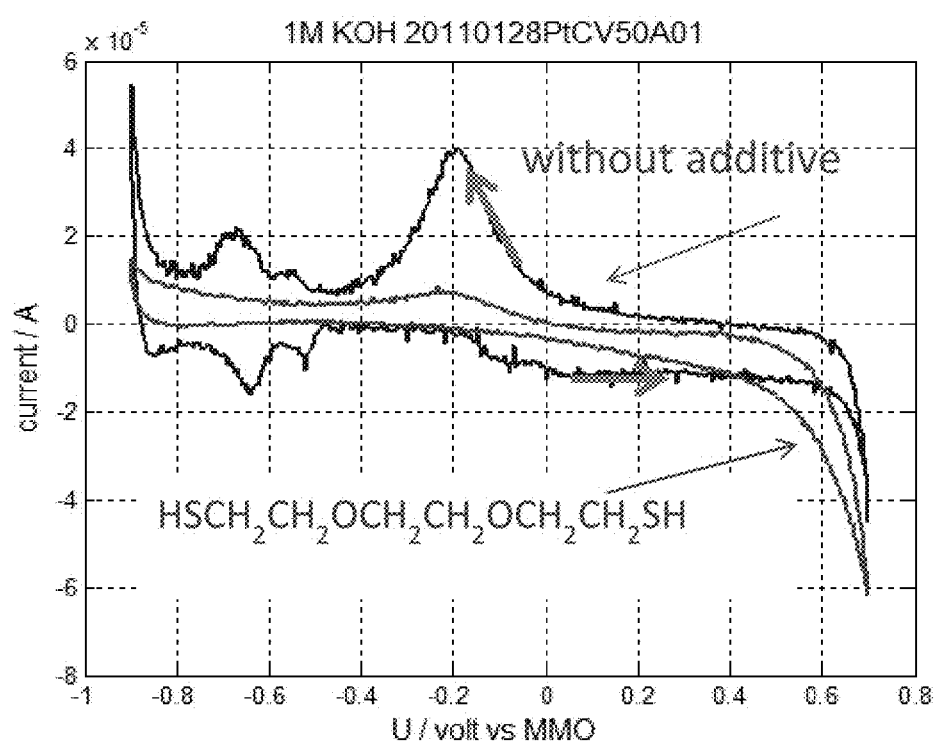
FIGS. 16a-b are graphs depicting cyclic voltammetry on a Pt electrode with long chain thiols (a) 1,2-ethanedithiol and (b) 2,2'-(ethylenedioxy)diethanethiol in 1M KOH solution at a scan rate 20 mV/s.
Figure 16B:
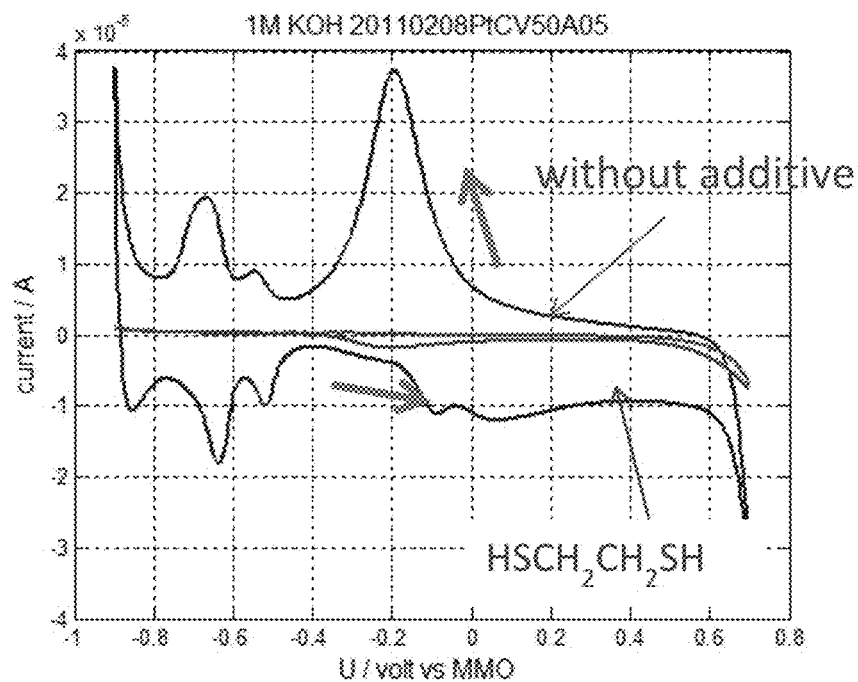

1,2-ethanedithiol and 2,2'-(ethylenedioxy)diethanethiol adsorb strongly on platinum electrodes, suppress the adsorption of hydrogen from water, and also resist oxidative degradation until 0.5V vs. NHE (FIGS. 16a-b). However, the iron electrodes only show a five to ten times increase in polarization resistance and five to ten times reduction in double layer capacitance. The packing of the self-assembled layers may not be as effective for the 2,2'-(ethylenedioxy) diethanethiol because of the different hydrophobic property of C—O linkage. For the ethanedithiol, complete suppression by the dithiol's lateral packing is also possible. However, they suppress the hydrogen evolution reaction significantly without inhibiting the iron electrode reaction completely. Therefore, 1,2-ethanedithiol and 2,2'-(ethylenedioxy)diethanethiol are very promising additives for improving the charge-efficiency of the iron electrode.

Figure 17:
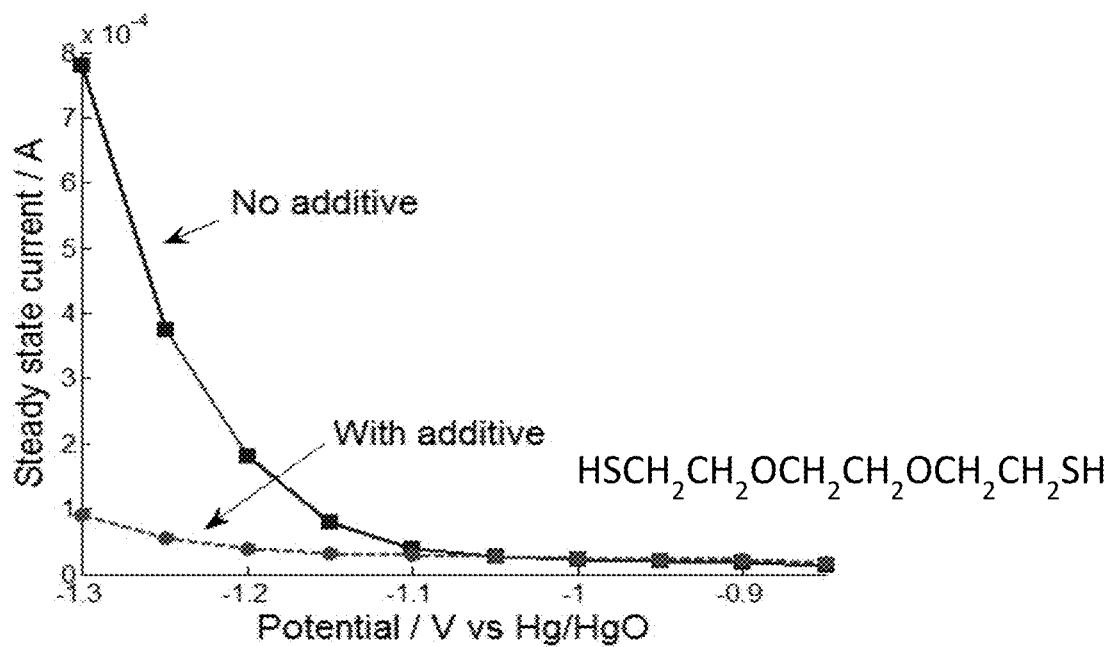
FIG. 17 is a graph depicting the steady state hydrogen evolution current on iron at various potentials in 1 M KOH solution with organosulfur additives.

The cyclic voltammetry experiment indicates the suppression of hydrogen evolution on iron electrode with different organosulfur additives. Steady state polarization experiment confirmed the CV result. Holding the potential for 300 seconds for each 50 mV step from −1.3 V to −0.85 V vs. mercury mercuric oxide (20% KOH) reference electrode, the hydrogen evolution was reduced 10 to $10^4$ times depending on different organosulfur additives (FIG. 17).

Figure 18A:
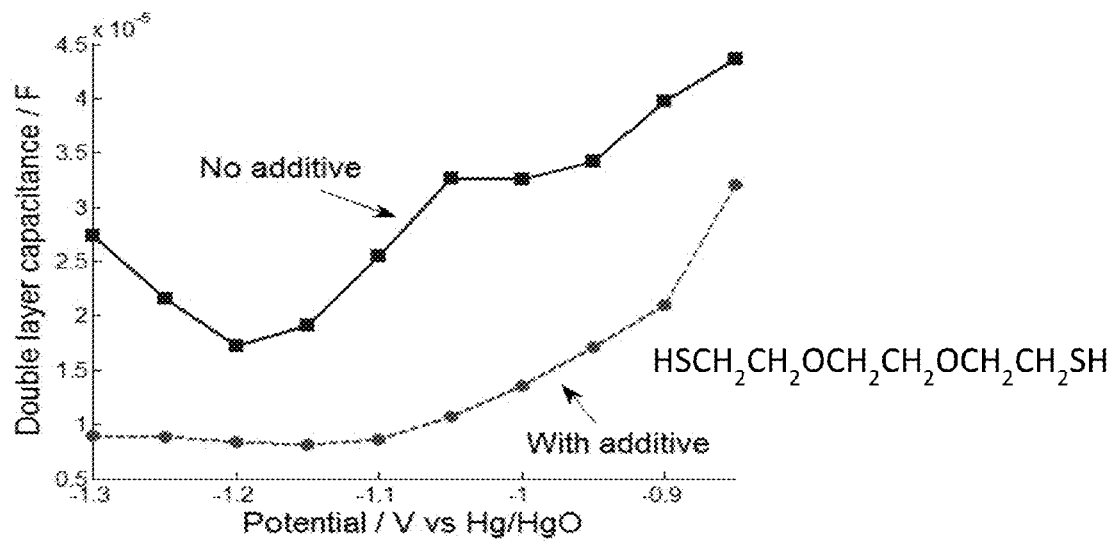
FIGS. 18a-b are graphs depicting the effect of organosulfur additives on (a) double layer capacitance and (b) polarization resistance from an impedance experiment on the iron electrode.
Figure 18B:
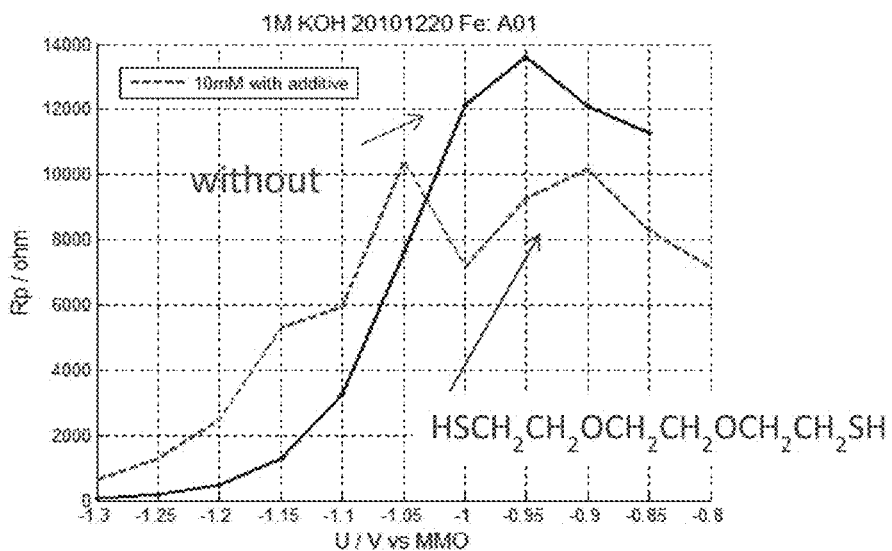

Following each steady state polarization experiment, an impedance measurement was performed to decide the effect of organic additive on iron electrode from the change in double layer capacitance and polarization resistance. It was observed that double layer capacitance decreased with organosulfur additive at various potentials. Correspondingly, the additive increased charge transfer resistance for $H_2$ evolution because of adsorption on the iron surface (FIGS. 18a-b). The additive decreased Rp in the Fe redox reaction because of reduction of passivation by $Fe(OH)_2$, which is consistent with the CV results on iron the electrode.

Figures 19A, 19B:
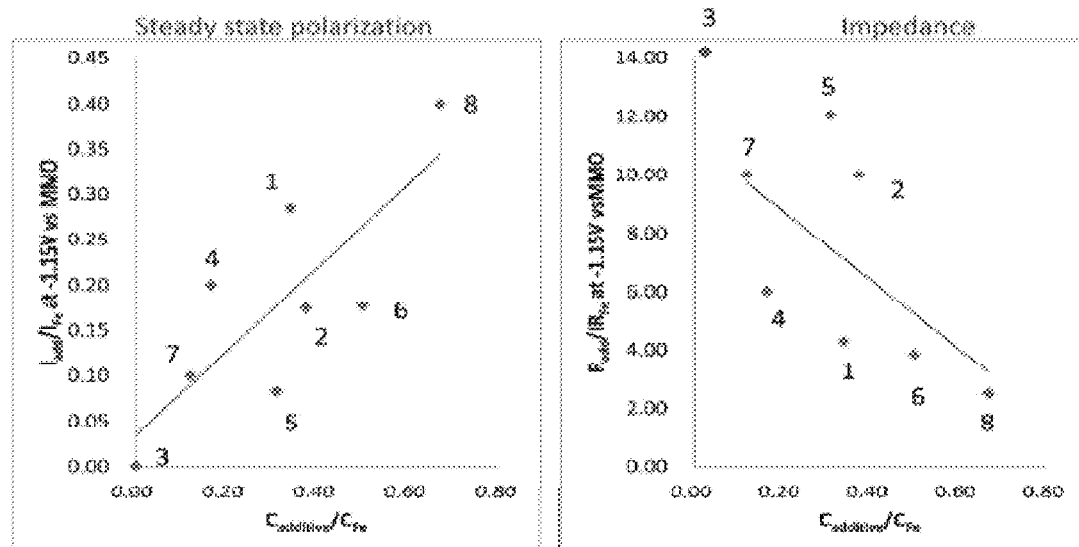
FIGS. 19a-b are graphs depicting (a) steady state polarization consistent with (b) impedance data on the iron electrode with different additives, namely 1) 3,6-dioxa-1,8-octanedithiol, 2) p-dithiane, 3) 1-dodecanethiol, 4) 1,2-ethanedithiol, 5) 2-methylbenzenethiol, 6) bismethylthiomethane, 7) 1-octanethiol, 8) sodium propanethiolate.

The steady state polarization experiment and impedance data with different additives are summarized in FIGS. 19a-b. In the plot, the double layer capacitance with additive was normalized to the one without additive. Hydrogen evolution current at −1.15V vs. MMO with additive was normalized to the current at the same potential without additive. Polarization resistance at −1.15V vs. MMO with additive was normalized to the one without additive. It was observed that all the organosulfur compounds can reduce the hydrogen evolution current. As the double layer capacitance decreases, the hydrogen evolution will be suppressed. Correspondingly, the polarization resistance will increase when the double layer capacitance decreases.

Figure 20:
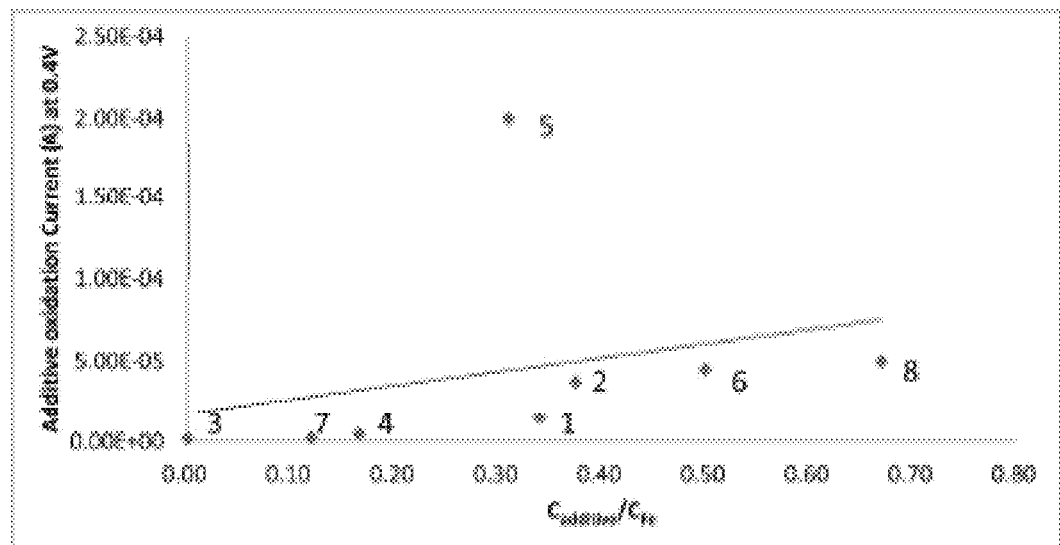
FIG. 20 is a graph depicting the correlation of oxidative stability on the Pt electrode with double layer capacitance obtained from impedance for 1) 3,6-dioxa-1,8-octanedithiol, 2) p-dithiane, 3) 1-dodecanethiol, 4) 1,2-ethanedithiol, 5) 2-methylbenzenethiol, 6) bismethylthiomethane, 7) 1-octanethiol, 8) sodium propanethiolate.

The double layer capacitance can be used to predict the oxidative stability of the organosulfur additives. FIG. 20 shows the oxidative current of different additives at 0.4V vs MMO. There is a linear relationship between the oxidative current and the corresponding double layer capacitance. The lower the double layer capacitance, the more stable the additive will be.

All the organosulfur additives tested adsorb on platinum and iron to a lesser or greater extent, reducing the area available for electrochemical reaction and suppressing the hydrogen evolution reaction on iron by 10 to $10^4$ times.

Some organosulfur additives do not inhibit the Fe electrode reactions. The oxidation of the additives on platinum occurs over the potential range of 0.1 V to 0.9 V vs. NHE. The packing density of self-assembled monolayers of thiols will determine the $H_2$ suppressing as well as the oxidative stability of the thiols. The double layer capacitance can be used to predict the $H_2$ suppressing effect and the stability of the additives. Organosulfur additives can be added to either the iron electrode or added to the electrolyte.

12-carbon chain alkyl thiol assemblies exclude water completely from the interface. Benzene thiol with an o- or p-carboxylic acid will stabilize it towards oxidation and could yield a useful additive. The linear and cyclic thioethers suppress hydrogen evolution but are easily oxidized to sulfones. A moderate level of suppression on the hydrogen evolution reaction is offered by 1,2-ethanedithiol and 3,6-dioxa-1,8-octanedithiol. Oxidation resistance and suppression of hydrogen evolution is also offered by p-dithiane, bismethylthiomethane, 1-octanethiol, sodium propanethiolate, and hexanethiol. These thiols have great potential to improve iron-air battery efficiency.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An iron electrode for use in an iron-based rechargeable battery, the iron electrode comprising carbonyl iron, a polymeric binder, and an additive for suppressing hydrogen evolution at the iron electrode during charging of the iron-based rechargeable battery, wherein the additive includes bismuth sulfide in an amount from 5 to 10 w/w % bismuth sulfide of the weight of the iron electrode.

2. The iron electrode of claim 1, wherein the iron electrode comprises approximately 76 w/w % carbonyl iron, approximately 10 w/w % soluble additive, approximately 9 w/w % polymeric binder, and approximately 5 w/w % bismuth sulfide.

3. The iron electrode of claim 1, further comprising an organosulfur additive.

4. The electrode of claim 3, wherein the organosulfur additive is an alkanethiol.

5. The electrode of claim 4, wherein the alkanethiol has a chain length in the range of n=6 to n=8.

6. The iron electrode of claim 3, wherein the organosulfur additive is selected from the group consisting of linear and cyclic thiols, dithiols, and thioethers.

7. The iron electrode of claim 6, wherein the organosulfur additive is selected from the group consisting of 3,6-dioxa-1,8-octanedithiol, p-dithiane, 1,2-ethanedithiol, bismethylthiomethane, 1-octanethiol, sodium propanethiolate, and hexanethiol.

8. The iron electrode of claim 1 having approximately 50-99 w/w % carbonyl iron and approximately 5-30 w/w % polymeric binder.

9. The iron electrode of claim 1 made by the method comprising:
   combining carbonyl iron powder with a polymeric binder to create a mixture;
   coating a metallic grid with the mixture; and heating and applying pressure to the grid to form the iron electrode, the iron electrode being a pressed-plate iron electrode.

10. An iron-air rechargeable battery, comprising:
an iron electrode comprising carbonyl iron, a polymeric binder, and bismuth sulfide, wherein the bismuth sulfide is present in an amount from 5 to 10 w/w % bismuth sulfide of the weight of the iron electrode;
an air electrode spaced from the iron electrode; and
an electrolyte in contact with the iron electrode and the air electrode.

11. The iron-air rechargeable battery of claim 10, wherein at least one of the iron electrode and the electrolyte includes an organosulfur additive.

12. The battery of claim 11, wherein the organosulfur additive is an alkanethiol.

13. The battery of claim 12, wherein the alkanethiol has a chain length in the range of n=6 to n=8.

14. The iron-air rechargeable battery of claim 11, wherein the organosulfur additive is selected from the group consisting of linear and cyclic thiols, dithiols, and thioethers.

15. The iron-air rechargeable battery of claim 14, wherein the organosulfur additive is selected from the group consisting of 3,6-dioxa-1,8-octanedithiol, p-dithiane, 1,2-ethanedithiol, bismethylthiomethane, 1-octanethiol, sodium propanethiolate, and hexanethiol.

16. An iron-air rechargeable battery, comprising:
an iron electrode that includes bismuth sulfide in an amount from 5 to 10 w/w % bismuth sulfide of the weight of the iron electrode;
an air electrode spaced from the iron electrode; and
an electrolyte in contact with the iron electrode and the air electrode, wherein the iron electrode includes carbonyl iron and a polymeric binder and at least one of the iron electrode and the electrolyte includes an organosulfur additive.

17. The battery of claim 16, wherein the organosulfur additive is an alkanethiol.

18. The battery of claim 17, wherein the alkanethiol has a chain length in the range of n=6 to n=8.

19. The iron-air rechargeable battery of claim 16, wherein the organosulfur additive is selected from the group consisting of linear and cyclic thiols, dithiols, and thioethers.

20. The iron-air rechargeable battery of claim 19, wherein the organosulfur additive is selected from the group consisting of 3,6-dioxa-1,8-octanedithiol, p-dithiane, 1,2-ethanedithiol, bismethylthiomethane, 1-octanethiol, sodium propanethiolate, and hexanethiol.

* * * * *